Jan. 10, 1950

R. J. THOMPSON 2,493,933

MACHINE FOR FORMING THREADED OPENINGS

Filed July 7, 1945

INVENTOR.
Roy J. Thompson,
BY
Wilkinson Huxley Byron & Knight
ATTYS.

Jan. 10, 1950  R. J. THOMPSON  2,493,933
MACHINE FOR FORMING THREADED OPENINGS
Filed July 7, 1945  7 Sheets-Sheet 6

INVENTOR.
Roy J. Thompson,
BY
Wilkinson Huxley Byron & Knight
Attys

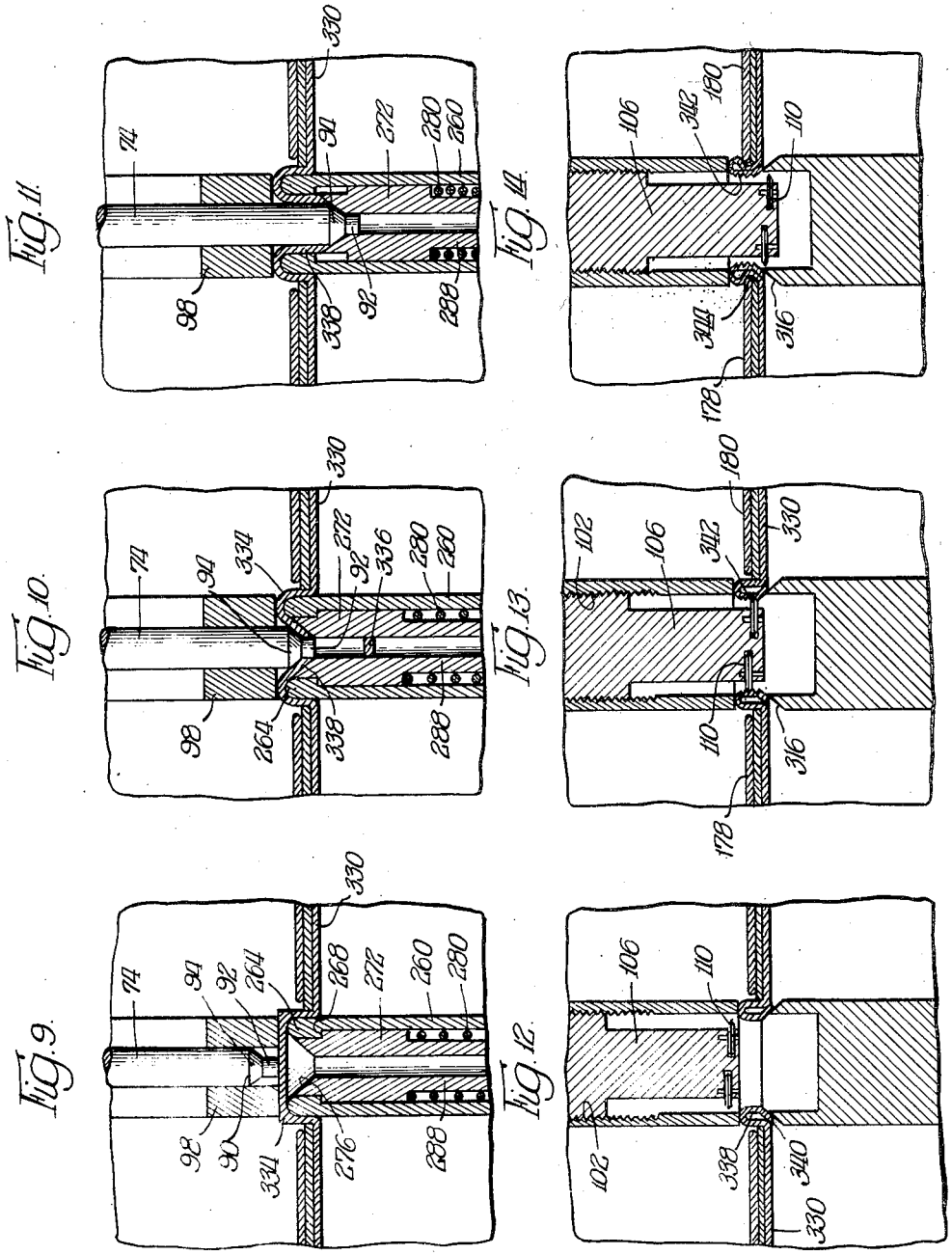

Patented Jan. 10, 1950

2,493,933

UNITED STATES PATENT OFFICE 2,493,933

MACHINE FOR FORMING THREADED OPENINGS

Roy J. Thompson, Gary, Ind., assignor to Inland Steel Company, Chicago, Ill., a corporation of Delaware Application July 7, 1945, Serial No. 603,683

18 Claims. (Cl. 29—34)

This invention pertains to a machine for forming a threaded opening in a member and thereafter forming said member to a desired shape, and more particularly to forming threaded bungs in container heads and the like.

An object of this invention is to provide a machine which forms a threaded opening in an article from material of the article and without the necessity of inserts.

Another object of the invention is to provide a machine which forms the complete barrel head or sizes an article after it forms a bung, or threaded opening therein.

Another object of the invention is to provide a machine for forming a threaded opening in an article, wherein the dies of said machine are readily replaceable to make different size openings.

Another object of the invention is to provide a single machine for forming the bung and head of a container where heretofore a number of machines were necessary.

Another object of the invention is to provide a machine capable of having the material feed in as from coil, stack or otherwise, and thereafter the machine forms a threaded opening therein and cuts the material to size.

Another object of the invention is to provide a machine capable of forming threaded openings in desired articles such as in barrels, containers, display stands, furniture, pictures and other fabricated articles.

Another object of the invention is to provide a machine capable of readily forming bungs in different gauge metal.

Another object of the invention is to provide a machine for economically putting threaded openings in containers or the like whereby there is a saving in time, labor and money in operating the machine and forming the opening in the article, and shaping the article.

Another object of the invention is to provide a machine for forming threads in openings where the surrounding metal is of relatively light gauge and where the threads are rolled rather than cut.

Another object of the invention is to provide a machine where the bung or threaded opening is formed completely and placed wherever desired and then the head is shaped, so that a round or other shaped head may be provided with the opening where desired.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1:
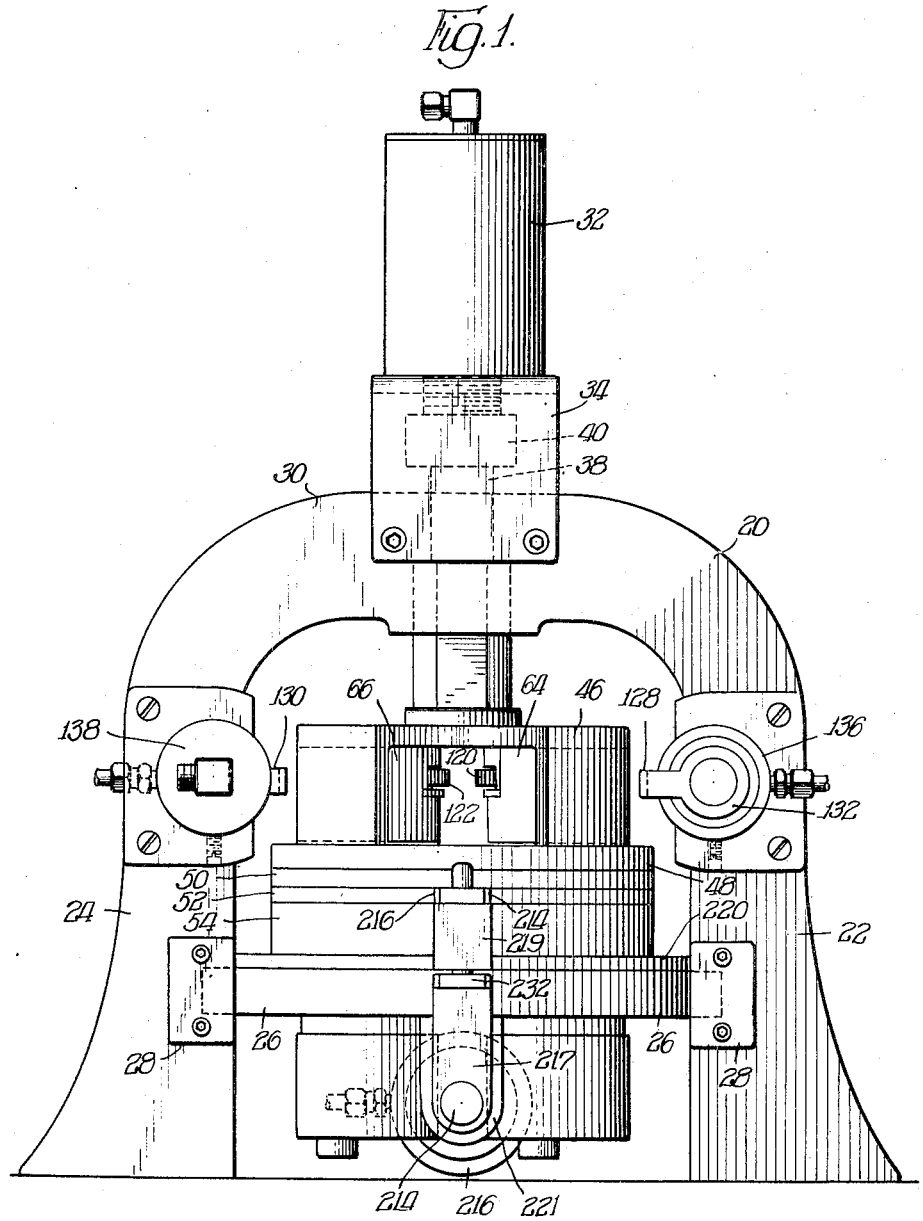
Figure 1 is a front elevation of a form of machine embodying the invention, for forming threaded openings such as bungs and the like, in articles such as barrel heads, etc.
Figure 2:
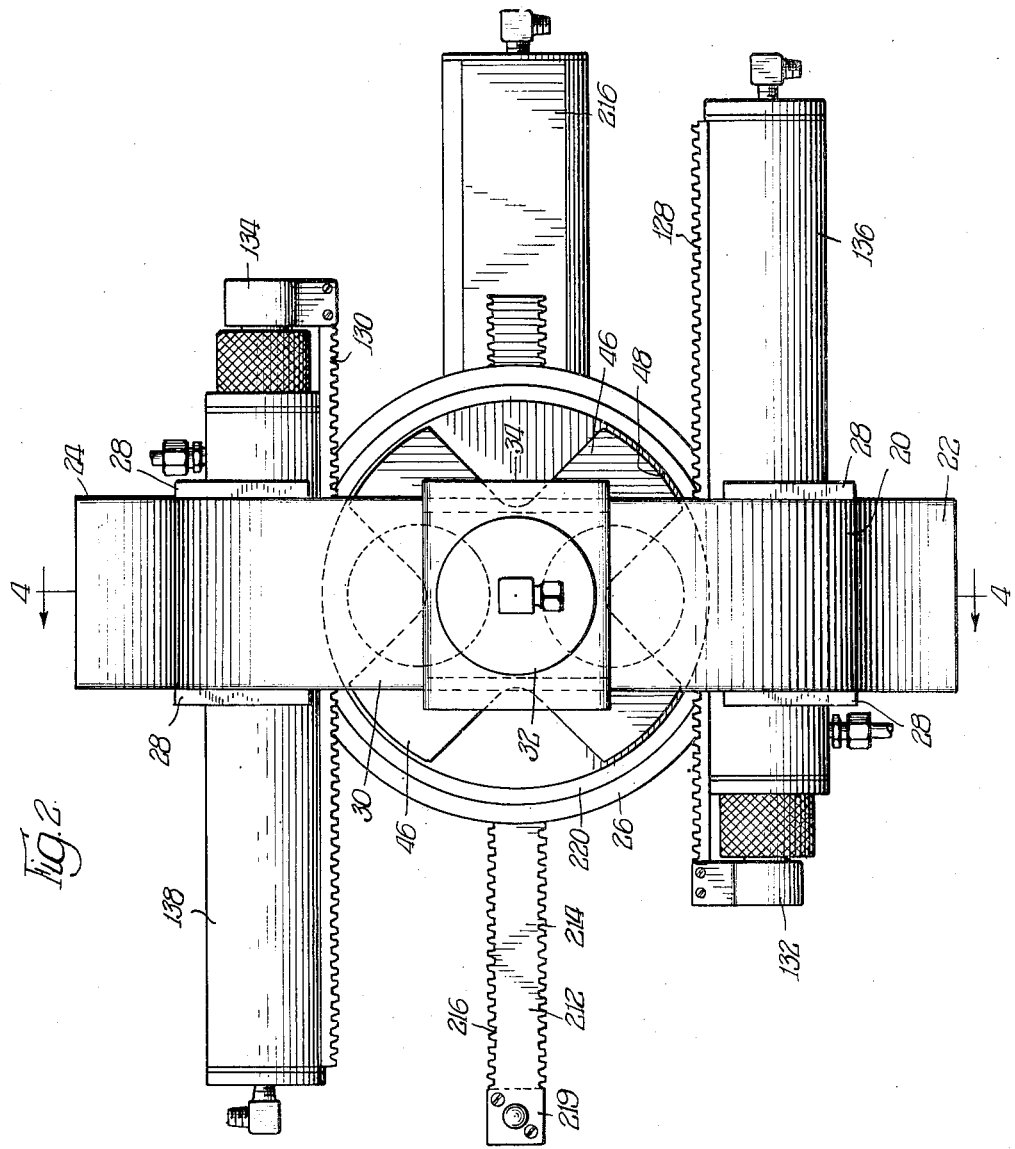
Figure 2 is a top plan view of the machine illustrated in Figure 1.
Figure 3:
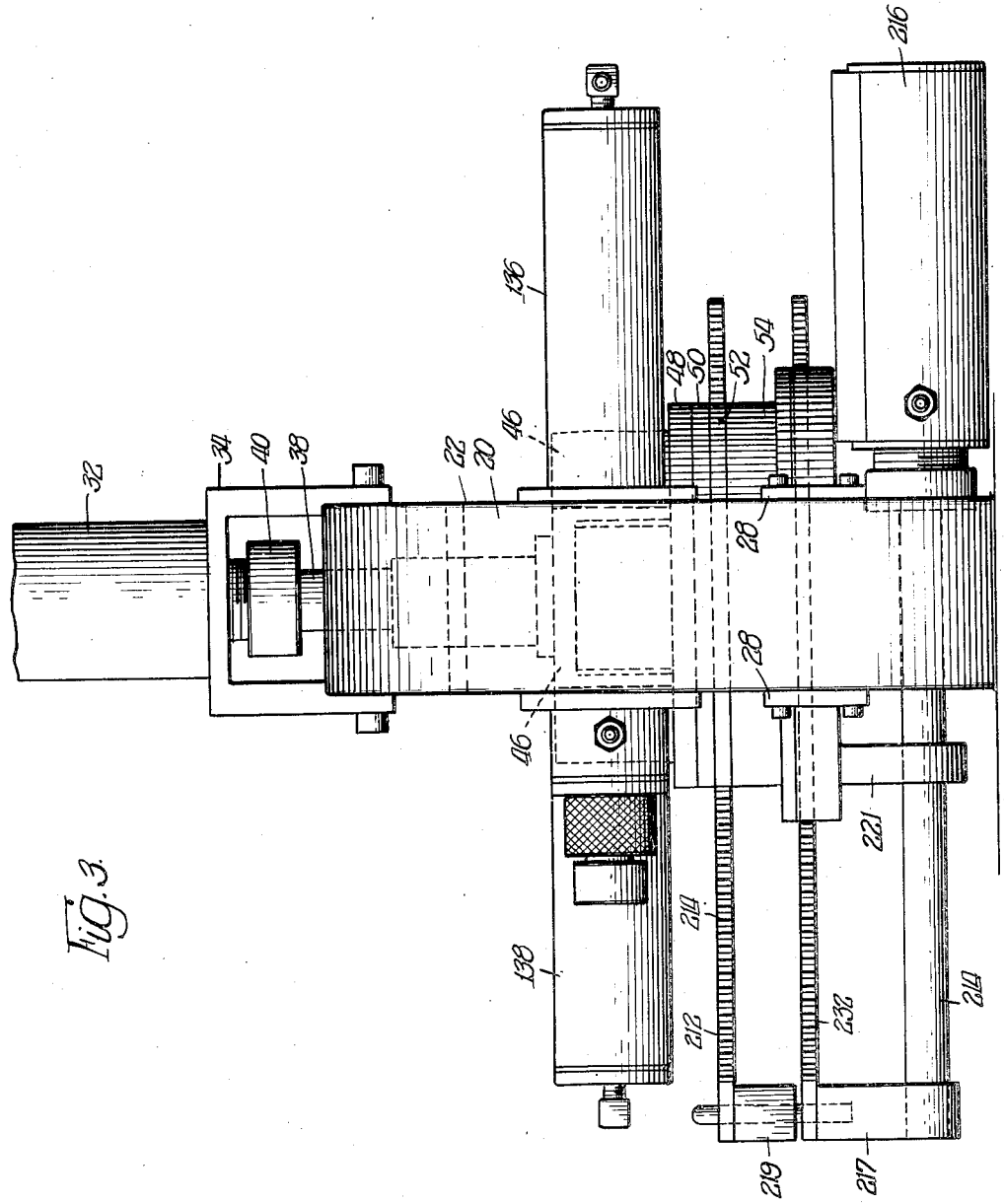
Figure 3 is a side elevation of the machine illustrated in Figure 1.

Figures 9 to 14 inclusive, are enlarged, fragmentary, vertical, sectional elevations through the forming dies of the machine illustrated in Figures 1 to 8 inclusive, showing various steps in the operation of the machine for forming a threaded opening in an article.

Referring first of all, more particularly, to the machine illustrated in Figures 1 to 8 inclusive, the machine comprises a main frame 20 shown as substantially inverted U-shape, having the spaced side supports 22 and 24, a horizontal bolster 26 being secured to said arms as at 28.

The upper horizontal portion or member 30 of the main frame connecting the arms 22 and 24, is provided with a main operating cylinder 32 secured to the member 30 by means of the yoke 34. The main operating cylinder is provided with the piston 36 mounted for reciprocation in the cylinder 32, said piston being provided with the piston rod 38 extending downwardly through a suitable stuffing box 40 and is reciprocally mounted in the member 30 as at 42.

The lower end of the piston rod 38 is secured as at 44 to the upper die supporting head 46. The upper die supporting head 46 is cut out to form arms 48, the lower portions of said arms being secured to the ring 50, the ring 50 being secured to the supporting plate 52 which in turn is secured to the lower die ring 54.

The arms 48 are provided with the spaced rings 56 and 58 in which pairs of cylinders are rotatably mounted. These cylinders are shown for forming bungs of different sizes. Each pair of cylinders comprises a punch cylinder 60 and 62 and a threaded cylinder 64 and 66. The pairs of cylinders 60 and 64, and 62 and 66 are each mounted in a cylinder or block 63 and 65 and these blocks are rotatably mounted in the rings 56 and 58 for revolving the cylinders, as will be later described. Cylinders 60 and 62 are provided with pistons 68 and 70 having piston rods 72 and 74 connected thereto, the upper walls of the cylinders being closed as at 76 and 78 and the lower walls 80 and 82 being apertured for the reception of the piston rods 72 and 74, suitable packing being provided in said lower walls.

A guide or closure 84 and 86 is threaded or otherwise secured to the cylinders 60 and 62 and forms a guide for the piston rods 72 and 74, the lower ends of the piston rods being provided with male die members 88 and 90, each having a punch portion 92 (Figures 9-14) and a conical portion 94, all for the purpose to be later described.

The male die members 88 and 90 are reciprocally mounted in the female die members 96 and 98 which are fixedly mounted with respect to the lower portion of the cylinders 60 and 62. The threading cylinders 64 and 66 comprise the master threads 100 and 102 for the reception of corresponding threads of the threading plungers 104 and 106 having the threading rollers 108 and 110 pivoted thereto. The upper portion of the plungers is provided with stems 112 and 114 to which the gears 116 and 118 are fixedly secured. Said gears mesh with gears 120 and 122 which are pivotally connected to the cylinders 64 and 66 as at 124 and 126, and in a certain step of the operation gears 120 and 122 are adapted to mesh with and be operated by auxiliary racks 128 and 130 which are adapted to be moved by suitable pistons 132 and 134 of auxiliary cylinders 136 and 138 supported in the arms 22 and 24.

In order to rotate the blocks and consequently the pairs of cylinders through 180° at a time, in the rings 56 and 58, said cylinders are provided with bearings 140 and 142 journaled in rings 56 and 58, and in order to operate the pistons 68 and 70 suitable passages 144 and 146, and 148 and 150 are provided, suitably controlled by means (not shown) for introducing operating fluid selectively to either side of said pistons. The lower die ring 54 acts as a retainer for the pressure plate 152, said pressure plate being resiliently spaced from the lower surfaces of the die members 96 and 98 by means of the springs 154, suitably spaced, a stop shoulder 155 being provided on the ring 54 to limit the upward movement of the pressure plate. The pressure plate 152 comprises the lower pressure member 156 to which is secured the upper retainer plates 158, the plates being apertured as at 160 and 162 for permitting the downward passage of the pistons 72 and 74 and the threading rollers 108 and 110.

The pressure plate is provided with recesses 164 and 166 (Figure 7) for accommodating means for forming a seal in a portion of the bung after completion, the recesses 164 and 166 being joined by the cam recess 168. Recesses 164 and 166 are provided with the abutments 170 and 172 which are preferably integral with the pressure plate.

Segments 174 and 176, and 178 and 180 are disposed within the recesses 164 and 166 and are shaped or cut out as at 182 and 184, 186 and 188 to correspond to apertures 160 and 162, the segments being adapted to be moved toward each other. The opposed cut out portions of the segments are so formed that in operative, recess forming position, the cut out portions of the two segments form a circle.

Yokes 190 and 192 are disposed in recesses 164 and 166 and the arms of said yokes abut the ends of the abutments 170 and 172. Cam 194 is provided in the cam recess 168 and the cam shaft 196 is retained in members 198 and 200, and are operated by any means, such as indicated generally at 202, for rotating the cam through 180°. This means may be a crank, rack or any other suitable means. Rotation of the cam through 180° causes movement of the yokes 190 and 192, causing the cam portions 204 and 206 of said yokes to react against corresponding cam portions of the segments 174 and 176, and 178 and 180, which being restricted in their recesses 164 and 166 will approach each other causing constriction of their cut out portions 182 and 184, and 186 and 188.

In order to rotate the cylinders so that they are moved through 180°, pinions 208 and 210 are provided on blocks 63 and 65 fixed with respect to the cylinders, and said pinions mesh with double rack 212 slotted to embrace the cam shaft 196 (Figure 6) the rack being operated by a suitable piston 214 operated by cylinder 216, said cylinder being supported on the main support 20, said piston being connected to rack 212 by connections 217 and 219, the piston rod being slidable in support 221.

The outer retaining ring 220 is suitably secured to the bolster 26 and is provided with an inner angularly disposed surface whereby said ring forms securing means for the hardened steel impression ring 222. Impression ring 222 is a tight fit with the inner retaining ring 224, said ring being recessed as at 226 for the purpose of flanging and reflanging, and forming the article containing the bung, such as, for example, flanging and reflanging a head of a container. The ring 224 overlaps the pinions 228 and 230. The pinions 228 and 230 are adapted to be operated by means of the rack 232 controlled by cylinder 216, the rack 232 being connected as at 217 to piston rod 214, whereby racks 212 and 232 operate in unison. The rack 232 is supported on the bolster, and the rack is covered by a portion of the inner retaining ring 224. Cylinders 234 and 236, 238 and 240 are fixed within the circular blocks 242 and 244, said blocks being rotatably mounted within rings 246 and 248, 250 and 252.

Pistons 254 and 256 are slidably mounted in cylinders 234 and 238 and are provided with the hollow piston rods 258 and 260 which extend upwardly and are formed adjacent the upper ends thereof with the rounded abutment members or rims 262 and 264, the abutment members being provided with positioning shoulders 266 and 268 forming an upper stop for the inner plungers 270 and 272. The upper end of each plunger is provided with the bevelled or sloping surface 274 and 276 corresponding to the surface 94 of the male dies. The inner plunger members 270 and 272 are urged upwardly by means of springs 278 and 280 abutting lower spring seats and packing members 282 and 284 secured within the piston rods 258 and 260. Said packing members 282 have slidable engagement with the downwardly projecting tubular portions 286 and 288 of the inner plungers 270 and 272.

In order to control operation of the pistons 254 and 256 the cylinders are provided with the passages 290, 292, 294 and 296 connected to suitable control mechanism whereby raising and lowering of the pistons is controlled. Pistons 298 and 300 are slidably mounted within cylinders 236 and 240 and are provided with the upwardly extending pistons 302 and 304, said pistons extending through suitable packing 306 and 308 and being recessed at their upper ends at 310 and 312 for the reception of the end of plungers 104 and 106, and the upper ends of said pistons are bevelled as at 314 and 316 for the purpose to be later described.

Cylinders 234 and 238 are closed by end closures 318 and 320 provided with suitable packing and packing nuts 322 and 324 embracing the end of tubular members 286 and 288, and cylinders 236 and 240 are closed by means of end closures 326 and 328.

When it is desired to apply or form a threaded opening or bung hole in an article, such as the plate 330 (Figures 9 to 14 inclusive) the plate is placed in position between the pressure plate 152 and the inner retaining ring 224 and it is disposed at a proper position for forming the desired bung.

Figure 4:
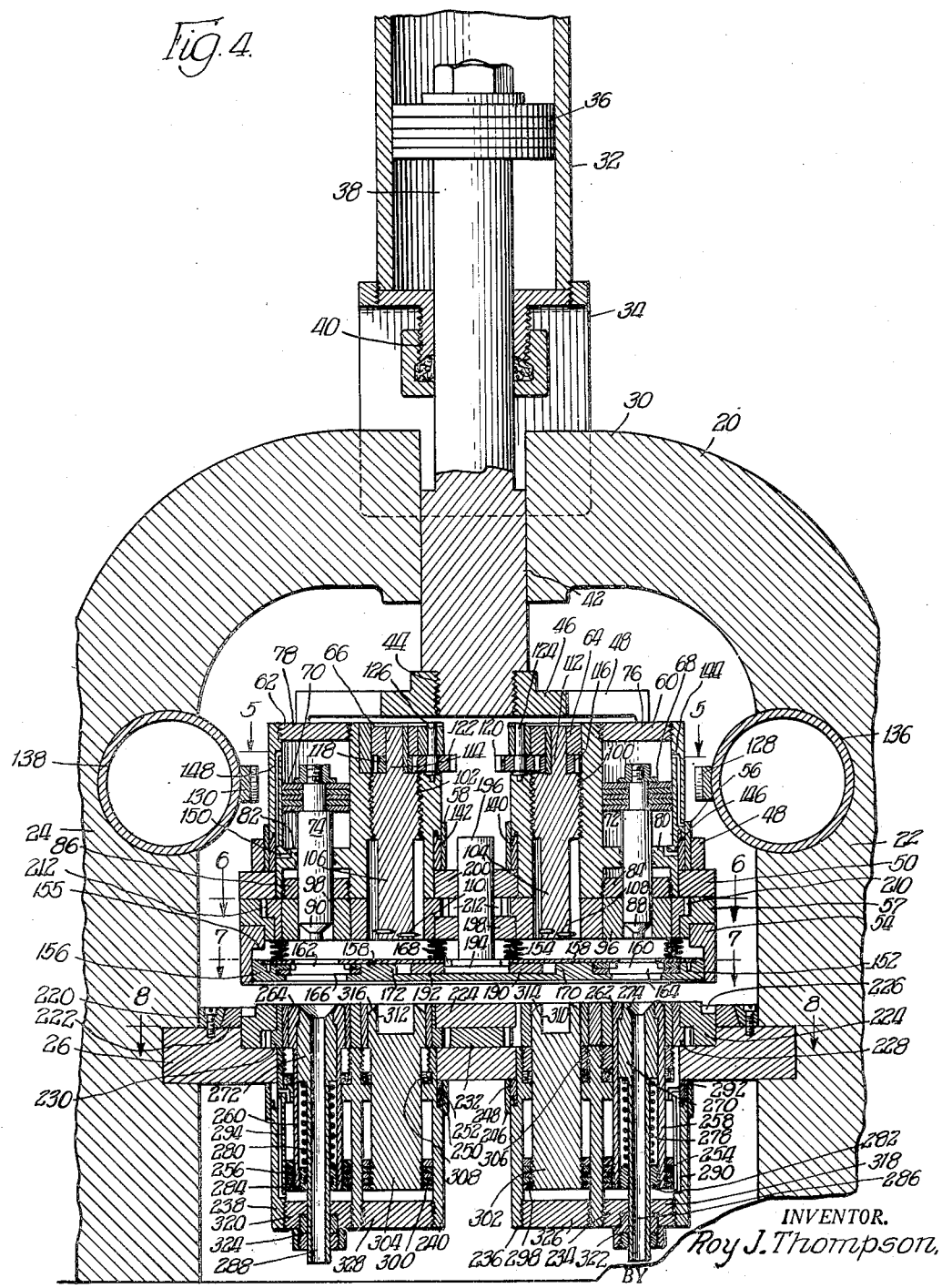
Figure 4 is an enlarged fragmentary, vertical, sectional elevation through the machine illustrated in Figures 1 to 3, the section being taken substantially in the plane as indicated by the line 4—4 of Figure 2.
Figure 5:
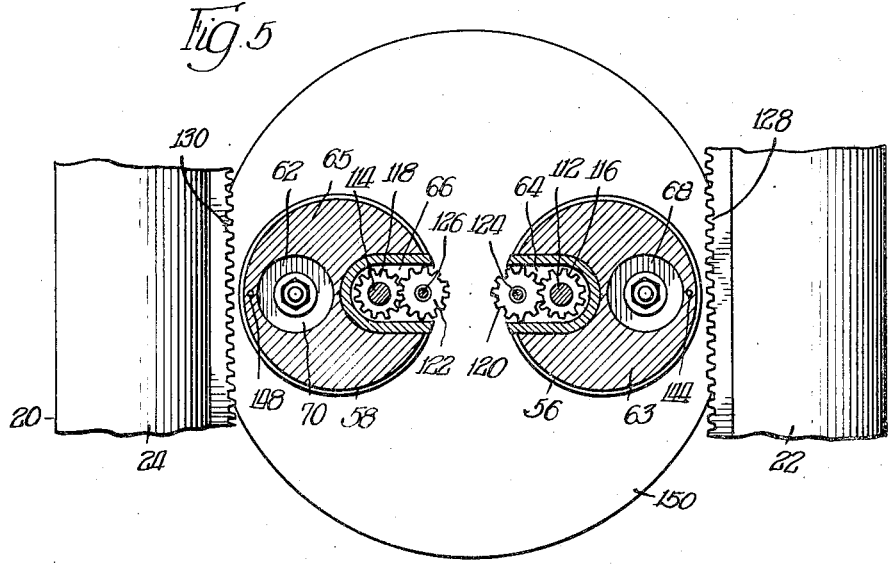
Figure 5 is a fragmentary, sectional plan view taken substantially in the plane as indicated by the line 5—5 of Figure 4.
Figure 6:
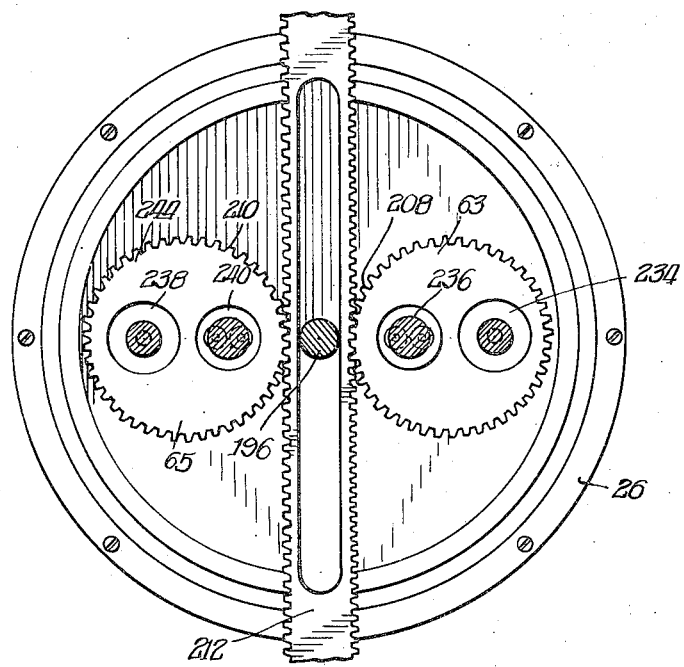
Figure 6 is a fragmentary, sectional plan view taken substantially in the plane as indicated by the line 6—6 of Figure 4.
Figure 7:
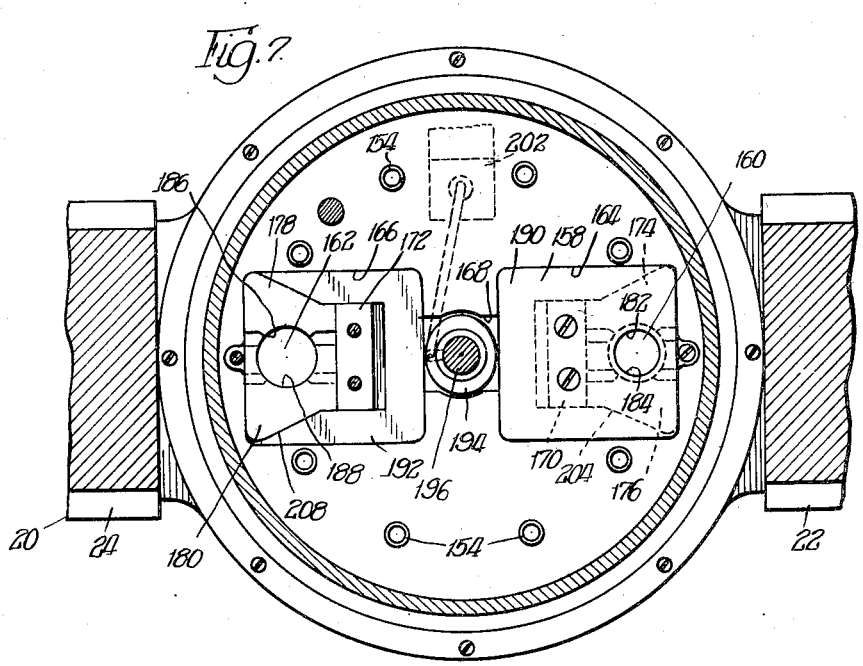
Figure 7 is a fragmentary, sectional plan view taken substantially in the plane as indicated by the line 7—7 of Figure 4.
Figure 8:
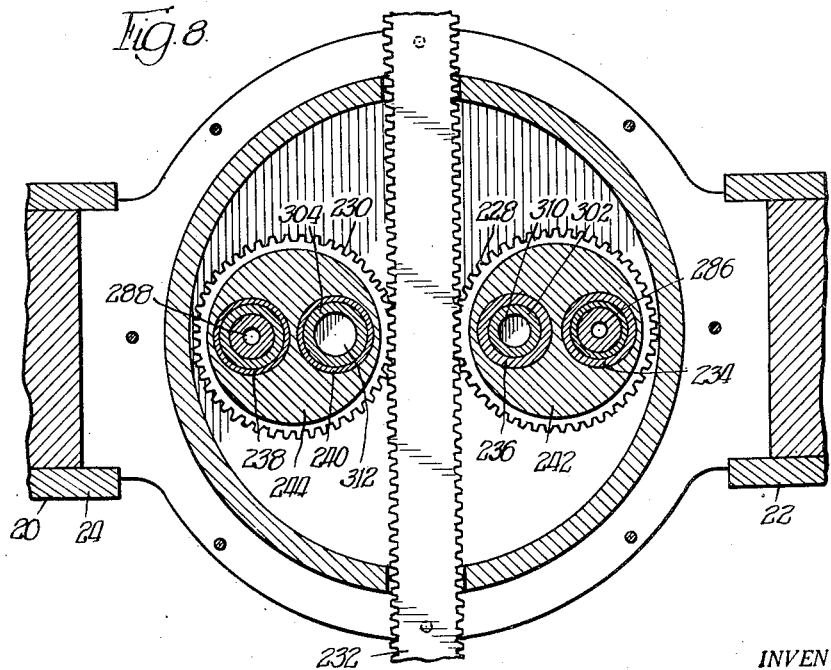
Figure 8 is a fragmentary, sectional plan view taken substantially in the plane as indicated by the line 8—8 of Figure 4.

Let it be assumed that only one bung is to be formed, and that is to be by means of the mechanism at the left of Figure 4. Operating fluid is admitted to the top of cylinder 32 causing downward movement of the piston 36 a predetermined amount, that is, to a position where the pressure plate 152 firmly engages the plate to be formed but springs 154 are not compressed. Operating fluid is admitted through passage 294 to the lower part of cylinder 238, causing upward movement of the piston 256 and, consequently, upward movement of the piston rod 260 and the inner plunger, as shown in Figure 9, to a position where a portion of the plate 330 is drawn to form the depression 334. Operating fluid is then supplied through passage 148 to the upper portion of cylinder 62 causing downward movement of the piston 70. Downward movement of the piston 70 causes downward movement of the piston rod 74 to the position illustrated in Figure 10 causing the punch portion 92 to punch the slug 336 from the depression 334, the slug 336 being ejected through the tube 288.

In descending, the bevelled end 94 will cause the inwardly directed flange 338 now formed, to be depressed to the angularity of surfaces 94 and 276. Continued downward movement of the piston 74 to the position illustrated in Figure 11, causes the reentrant flange 338 to move to a position where its axis coincides with the axis of the plunger, this downward movement of the plunger 74, being permitted as the plunger 272 will move downwardly, compressing the spring 280. The plunger 74 is then withdrawn or moved upwardly by exhausting operating fluid from the upper portion of the cylinder 62 and introducing operating fluid through passage 150, and operating fluid is exhausted from cylinder 238 below piston 256 and operating fluid is introduced through passage 296 causing downward movement of the piston rod 260 and, consequently, inner plunger 272.

Racks 212 and 232 are moved a predetermined amount by operation of cylinder 216 and piston rod 214, causing a predetermined rotation of pinions 210 (and 208), and 230 (and 228). The pinions rotate until the blocks 65 and 242 (and 63 and 244) are moved through 180°, which will cause plunger 106 and recess 312 to be moved into vertical alignment with flange 338. Operating fluid is then admitted to cylinder 328 causing upward movement of the piston 300, which in turn will cause the surface 316 to reflange the flange 338 as at 340 (Figure 12), causing a tight abutment between the flange 340 and plate 330 at its upward deformation. The rack 130 is then moved a predetermined amount by cylinder 138 causing rotation of pinions 122 and 118. Rotation of these pinions causes rotation of the plunger 106 through the master threads 102 which causes the rollers 110 to move downwardly in accordance with the master threads 102, rolling threads 342 on the inside of the flange 338, above flange 340 (Figure 13). These threads are to receive complementary threads of a suitable threaded closure member. Cam 194 now is operated to cause segments 178 and 180 to move a predetermined amount to their operative innermost position where the cut out portions of the segments form a circle whereby the seal channel 344 is formed on the outer part of the bung and in so forming the channel an upper bead is formed which strengthens the bung. The plunger 106 can then be operated in a reverse direction to move it to inoperative position.

Piston 300 is then moved downwardly to inoperative position, and piston 36 can be moved downwardly an additional amount causing the plate 330 to be formed and flanged within the recess 226 and sheared off at the outer portion of the recess adjacent the impression ring 222. Piston 134 can now return rack 130 to its initial position returning the plunger 106 to its inoperative upper position. Piston 36 can then be moved upwardly to release the formed article and piston 214 can return the blocks 65 and 244 to their original positions as shown in Figure 4, and the machine is then in condition for a new cycle of operation.

While cylinders have been shown as operating means, which may be either air or hydraulically operated, it is, of course, understood that any form of operating means may be used and it is to be further understood that this application is not limited by the exact embodiments of the device shown, which are merely by way of illustration and not limitation as various and other forms of the device will, of course, be apparent to those skilled in the art without departing from the spirit of the invention or the scope of the claims.

I claim:

1. In a device of the character described, the combination of a support, a bolster carried by said support, a die supporting head disposed above said bolster, operating means for moving said head toward and away from said bolster in a controlled manner, a block rotatably mounted in said head and a block rotatably mounted in said bolster, means for simultaneously rotating said blocks, one of said blocks having a pair of dies therein disposed in alignment with a die of a pair of dies in the other block, a die of one block comprising a plunger having a male frusto-conical end terminating in a punch, the aligned die of the other block comprising a hollow rod having a rounded rim facing the first named die, and an inner reciprocal member resiliently urged toward the first named die, said hollow rod and inner member having a female frusto-conical end similar to said male end, said inner member being provided with a passage aligned with said punch for disposing of material punched by said punch, means for selectively operating said first die toward the second die, and said second die toward said first die, the other die of the pair of dies in the first block comprising a threading plunger having threading means thereon, master thread means for moving said plunger and threading means in a predetermined manner toward and away from said bolster when said threading plunger is moved, means for moving said threading plunger, the die of the second block aligned with said threading plunger comprising a member movable toward and away from said threading plunger, means for moving said last named member, the end of said last named member having a recess for permitting predetermined movement of said threading plunger, said last named end being bevelled, a compression plate supported on said head, resilient means between said compression plate and head permitting movement of said plate toward said head, and means carried by said compression plate operable to move toward the axis of said threading plunger and recess in a restricting and in substantially a circular manner.

2. In a device of the character described, the combination of a support, a bolster carried by said support, a die supporting head disposed above said bolster, operating means for moving said head toward and away from said bolster in a controlled manner, a block rotatably mounted in said head and a block rotatably mounted in said bolster, means for simultaneously rotating said blocks, one of said blocks having a pair of dies therein disposed in alignment with a die of a pair of dies in the other block, a die of one block comprising a plunger having a male frusto-conical end terminating in a punch, the aligned die of the other block comprising a hollow rod having a rounded rim facing the first named die, and an inner reciprocal member resiliently urged toward the first named die, said hollow rod and inner member having a female frusto-conical end similar to said male end, said inner member being provided with a passage aligned with said punch for disposing of material punched by said punch, means for selectively operating said first die toward the second die, and said second die toward said first die, the other die of the pair of dies in the first block comprising a threading plunger having threading means thereon, master thread means for moving said plunger and threading means in a predetermined manner toward and away from said bolster when said threading plunger is moved, means for moving said threading plunger, the die of the second block aligned with said threading plunger comprising a member movable toward and away from said threading plunger, means for moving said last named member, the end of said last named member having a recess for permitting predetermined movement of said threading plunger, said last named end being bevelled, a compression plate supported on said head, resilient means between said compression plate and head permitting movement of said plate toward said head, said compression plate having an aperture therethrough through which said first named plunger and threading plunger are adapted to operate when the aligned dies are selectively aligned with said aperture, and means carried by said compression plate for restricting said last named aperture in substantially a circular manner.

3. In a device of the character described, the combination of a support, a bolster carried by said support, a die supporting head disposed above said bolster, operating means for moving said head toward and away from said bolster in a controlled manner, a block rotatably mounted in said head and a block rotatably mounted in said bolster, means for simultaneously rotating said blocks, one of said blocks having a pair of dies therein disposed in alignment with a die of a pair of dies in the other block, a die of one block comprising a plunger having a male frusto-conical end terminating in a punch, the aligned die of the other block comprising a hollow rod having a rounded rim facing the first named die, and an inner reciprocal member resiliently urged toward the first named die, said hollow rod and inner member having a female frusto-conical end similar to said male end, said inner member being provided with a passage aligned with said punch for disposing of material punched by said punch, means for selectively operating said first die toward the second die, and said second die toward said first die, the other die of the pair of dies in the first block comprising a threading plunger having threading means thereon, master thread means for moving said plunger and threading means in a predetermined manner toward and away from said bolster when said threading plunger is moved, means for moving said threading plunger, the die of the second block aligned with said threading plunger comprising a member movable toward and away from said threading plunger, means for moving said last named member, the end of said last named member having a recess for permitting predetermined movement of said threading plunger, said last named end being bevelled, a compression plate supported on said head, resilient means between said compression plate and head permitting movement of said plate toward said head, said compression plate having an aperture therethrough through which said first named plunger and threading plunger are adapted to operate when the aligned dies are selectively aligned with said aperture, means carried by said compression plate for restricting said last named aperture in substantially a circular manner, and a die member supported by said bolster providing flanging and cutting means effective upon moving said compression plate toward said bolster a predetermined amount.

4. In a device of the character described, the combination of a support, a bolster carried by said support, a die supporting head disposed above said bolster, operating means for moving said head toward and away from said bolster in a controlled manner, a block rotatably mounted in said head and a block rotatably mounted in said bolster, means for simultaneously rotating said blocks, one of said blocks having a pair of dies therein disposed in alignment with a die of a pair of dies in the other block, a die of one block comprising a plunger having a male frusto-conical end terminating in a punch, the aligned die of the other block comprising a hollow rod having a rounded rim facing the first named die, and an inner reciprocal member resiliently urged toward the first named die, said hollow rod and inner member having a female frusto-conical end similar to said male end, said inner member being provided with a passage aligned with said punch for disposing of material punched by said punch, means for selectively operating said first die toward the second die, and said second die toward said first die, the other die of the pair of dies in the first block comprising a threading plunger having threading means thereon, master thread means for moving said plunger and threading means in a predetermined manner toward and away from said bolster when said threading plunger is moved, means for moving said threading plunger, the die of the second block aligned with said threading plunger comprising a member movable toward and away from said threading plunger, means for moving said last named member, the end of said last named member having a recess for permitting predetermined movement of said threading plunger, said last named end being bevelled, a compression plate supported on said head, resilient means between said compression plate and head permitting movement of said plate toward said head, means carried by said compression plate operable to move toward the axis of said threading plunger and recess in a restricting and in substantially a circular manner, and a die member supported by said bolster providing flanging and cutting means effective upon moving said compression plate toward said bolster a predetermined amount.

5. In a device of the character described, the combination of a support, a bolster carried by said support, a die supporting head disposed above said bolster, operating means for moving said head toward and away from said bolster in a controlled manner, a block rotatably mounted in said head and a block rotatably mounted in said bolster, means for simultaneously rotating said blocks, one of said blocks having a pair of dies therein disposed in alignment with a die of a pair of dies in the other block, a die of one block comprising a plunger having a male frusto-conical end terminating in a punch, the aligned die of the other block comprising a hollow rod having a rounded rim facing the first named die, and an inner reciprocal member resiliently urged toward the first named die, said hollow rod and inner member having a female frusto-conical end similar to said male end, said inner member being provided with a passage aligned with said punch for disposing of material punched by said punch, means for selectively operating said first die toward the second die, and said second die toward said first die, the other die of the pair of dies in the first block comprising a threading plunger having threading means thereon, master thread means for moving said plunger and threading means in a predetermined manner toward and away from said bolster when said threading plunger is moved, means for moving said threading plunger, the die of the second block aligned with said threading plunger comprising a member movable toward and away from said threading plunger, means for moving said last named member, the end of said last named member having a recess for permitting predetermined movement of said threading plunger, said last named end being bevelled, a compression plate supported on said head, resilient means between said compression plate and head permitting movement of said plate toward said head and means operable to move toward the axis of said threading plunger and recess in a restricting and in substantially a circular manner.

6. In a device of the character described, the combination of a support, a bolster carried by said support, a die supporting head disposed above said bolster, operating means for moving said head toward and away from said bolster in a controlled manner, a block rotatably mounted in said head and a block rotatably mounted in said bolster, means for simultaneously rotating said blocks, one of said blocks having a pair of dies therein disposed in alignment with a die of a pair of dies in the other block, a die of one block comprising a plunger having a male frusto-conical end terminating in a punch, the aligned die of the other block comprising a hollow rod having a rounded rim facing the first named die, and an inner reciprocal member resiliently urged toward the first named die, said hollow rod and inner member having a female frusto-conical end similar to said male end, said inner member being provided with a passage aligned with said punch for disposing of material punched by said punch, means for selectively operating said first die toward the second die, and said second die toward said first die, the other die of the pair of dies in the first block comprising a threading plunger having threading means thereon, master thread means for moving said plunger and threading means in a predetermined manner toward and away from said bolster when said threading plunger is moved, means for moving said threading plunger, the die of the second block aligned with said threading plunger comprising a member movable toward and away from said threading plunger, means for moving said last named member, the end of said last named member having a recess for permitting predetermined movement of said threading plunger, said last named end being bevelled, a compression plate supported on said head, resilient means between said compression plate and head permitting movement of said plate toward said head, said compression plate having an aperture therethrough through which said first named plunger and threading plunger are adapted to operate when the aligned dies are selectively aligned with said aperture, and means for restricting said last named aperture in substantially a circular manner.

7. In a device of the character described, the combination of a support, a bolster carried by said support, a die supporting head disposed above said bolster, operating means for moving said head toward and away from said bolster in a controlled manner, a block rotatably mounted in said head and a block rotatably mounted in said bolster, means for simultaneously rotating said blocks, one of said blocks having a pair of dies therein disposed in alignment with a die of a pair of dies in the other block, a die of one block comprising a plunger having a male frusto-conical end terminating in a punch, the aligned die of the other block comprising a hollow rod having a rounded rim facing the first named die, and an inner reciprocal member resiliently urged toward the first named die, said hollow rod and inner member having a female frusto-conical end similar to said male end, said inner member being provided with a passage aligned with said punch for disposing of material punched by said punch, means for selectively operating said first die toward the second die, and said second die toward said first die, the other die of the pair of dies in the first block comprising a threading plunger having threading means thereon, master thread means for moving said plunger and threading means in a predetermined manner toward and away from said bolster when said threading plunger is moved, means for moving said threading plunger, the die of the second block aligned with said threading plunger comprising a member movable toward and away from said threading plunger, means for moving said last named member, the end of said last named member having a recess for permitting predetermined movement of said threading plunger, said last named end being bevelled, a compression plate supported on said head, resilient means between said compression plate and head permitting movement of said plate toward said head and means operable to move toward the axis of said threading plunger and recess in a restricting and in substantially a circular manner, and a die member supported by said bolster providing flanging and cutting means effective upon moving said compression plate toward said bolster a predetermined amount.

8. In a device of the character described, the combination of a support, a bolster carried by said support, a die supporting head disposed above said bolster, operating means for moving said head toward and away from said bolster in a controlled manner, a block rotatably mounted in said head and a block rotatably mounted in said bolster, means for simultaneously rotating said blocks, one of said blocks having a pair of dies therein disposed in alignment with a die of a pair of dies in the other block, a die of one block comprising a plunger having a male frusto-conical end terminating in a punch, the aligned die of the other block comprising a hollow rod having a rounded rim facing the first named die, and an inner reciprocal member resiliently urged toward the first named die, said hollow rod and inner member having a female frusto-conical end similar to said male end, said inner member being provided with a passage aligned with said punch for disposing of material punched by said punch, means for selectively operating said first die toward the second die, and said second die toward said first die, the other die of the pair of dies in the first block comprising a threading plunger having threading means thereon, master thread means for moving said plunger and threading means in a predetermined manner toward and away from said bolster when said threading plunger is moved, means for moving said threading plunger, the die of the second block aligned with said threading plunger comprising a member movable toward and away from said threading plunger, means for moving said last named member, the end of said last named member having a recess for permitting predetermined movement of said threading plunger, said last named end being bevelled, a compression plate supported on said head, resilient means between said compression plate and head permitting movement of said plate toward said head, said compression plate having an aperture therethrough through which said first named plunger and threading plunger are adapted to operate when the aligned dies are selectively aligned with said aperture, and means for restricting said last named aperture in substantially a circular manner, and a die member supported by said bolster providing flanging and cutting means effective upon moving said compression plate toward said bolster a predetermined amount.

9. In a device of the character described, the combination of a support, a bolster carried by said support, a die supporting head disposed above said bolster, a compression plate supported on said head having an aperture therethrough, operating means for moving said head toward and away from said bolster in a controlled manner, said head having a die comprising a plunger having a male frusto-conical end terminating in a punch alignable with said aperture, a die in said bolster aligned with said first die and alignable with said aperture, said second die comprising a hollow rod having a rounded rim facing the first named die, and an inner reciprocal member resiliently urged toward the first named die, said hollow rod and inner member having a female frusto-conical end similar to said male end, said inner member being provided with a passage aligned with said punch for disposing of material punched by said punch, means for selectively operating said first die toward the second die, and said second die toward said first die, another die alignable with said aperture and carried by said head comprising a threading plunger having threading means thereon, master thread means for moving said plunger and threading means in a predetermined manner toward and away from said bolster when said threading plunger is moved, means for moving said threading plunger, a die carried by said bolster aligned with said third named die and alignable with said aperture, said fourth named die comprising a member movable toward and away from said threading plunger, means for moving said last named member, the end of said last named member having a recess for permitting predetermined movement of said threading plunger, said last named end being bevelled, resilient means between said compression plate and head permitting movement of said plate toward said head, and means for selectively aligning said first and second named dies and said aperture and for aligning said third and fourth named dies with said aperture.

10. In a device of the character described, the combination of a support, a bolster carried by said support, a die supporting head disposed above said bolster, a compression plate supported on said head having an aperture therethrough adapted to be restricted in a circular manner, operating means for moving said head toward and away from said bolster in a controlled manner, said head having a die comprising a plunger having a male frusto-conical end terminating in a punch alignable with said aperture, a die in said bolster aligned with said first die and alignable with said aperture, said second die comprising a hollow rod having a rounded rim facing the first named die, and an inner reciprocal member resiliently urged toward the first named die, said hollow rod and inner member having a female frusto-conical end similar to said male end, said inner member being provided with a passage aligned with said punch for disposing of material punched by said punch, means for selectively operating said first die toward the second die, and said second die toward said first die, another die alignable with said aperture carried by said head comprising a threading plunger having threading means thereon, master thread means for moving said plunger and threading means in a predetermined manner toward and away from said bolster when said threading plunger is moved, means for moving said threading plunger, a die carried by said bolster aligned with said third named die and alignable with said aperture, said fourth named die comprising a member movable toward and away from said threading plunger, means for moving said last named member, the end of said last named member having a recess for permitting predetermined movement of said threading plunger, said last named end being bevelled, resilient means between said compression plate and head permitting movement of said plate toward said head, means for selectively aligning said first and second named dies and said aperture and for aligning said third and fourth named dies with said aperture, and means carried by said compression plate for restricting said last named aperture in substantially a circular manner.

11. In a device of the character described, the combination of a support, a bolster carried by said support, a die supporting head disposed above said bolster, a compression plate on said head having an aperture adapted to be restricted in a circular manner, operating means for moving said head toward and away from said bolster in a controlled manner, said head having a die comprising a plunger having a male frusto-conical end terminating in a punch alignable with said aperture, a die in said bolster aligned with said first die and alignable with said aperture, said second die comprising a hollow rod having a rounded rim facing the first named die, and an inner reciprocal member resiliently urged toward the first named die, said hollow rod and inner member having a female frusto-conical end similar to said male end, said inner member being provided with a passage aligned with said punch for disposing of material punched by said punch, means for selectively operating said first die toward the second die, and said second die toward said first die, another die alignable with said aperture carried by said head comprising a threading plunger having threading means thereon, master thread means for moving said plunger and threading means in a predetermined manner toward and away from said bolster when said threading plunger is moved, means for moving said threading plunger, a die carried by said bolster aligned with said third named die and alignable with said aperture, said fourth named alignable with said aperture, said fourth named die comprising a member movable toward and away from said threading plunger, means for moving said last named member, the end of said last named member having a recess for permitting predetermined movement of said threading plunger, said last named end being bevelled, resilient means between said compression plate and head permitting movement of said plate toward said head, means for selectively aligning said first and second named dies and said aperture and for aligning said third and fourth named dies with said aperture, and means for restricting said last named aperture in substantially a circular manner.

12. In a device of the character described, the combination of a support, a bolster carried by said support, a die supporting head disposed above said bolster, a compression plate supported on said head and having an aperture therethrough, operating means for moving said head toward and away from said bolster in a controlled manner, said head having a die comprising a plunger having a male frusto-conical end terminating in a punch alignable with said aperture, a die in said bolster aligned with said first die and alignable with said aperture, said second die comprising a hollow rod having a rounded rim facing the first named die, and an inner reciprocal member resiliently urged toward the first named die, said hollow rod and inner member having a female frusto-conical end similar to said male end, said inner member being provided with a passage aligned with said punch for disposing of material punched by said punch, means for selectively operating said first die toward the second die, and said second die toward said first die, another die alignable with said aperture and carried by said head comprising a threading plunger having threading means thereon, master thread means for moving said plunger and threading means in a predetermined manner toward and away from said bolster when said threading plunger is moved, means for moving said threading plunger, a die carried by said bolster aligned with said third named die and alignable with said aperture, said fourth named die comprising a member movable toward and away from said threading plunger, means for moving said last named member, the end of said last named member having a recess for permitting predetermined movement of said threading plunger, said last named end being bevelled, resilient means between said compression plate and head permitting movement of said plate toward said head, means for selectively aligning said first and second named dies and said aperture and for aligning said third and fourth named dies with said aperture, and means carried by said compression plate operable to move toward the axis of said threading plunger and recess in a restricting and in substantially a circular manner.

13. In a device of the character described, the combination of a support, a bolster carried by said support, a die supporting head disposed above said bolster, a compression plate supported on said head and having an aperture therethrough, operating means for moving said head toward and away from said bolster in a controlled manner, said head having a die comprising a plunger having a male frusto-conical end terminating in a punch alignable with said aperture, a die in said bolster aligned with said first die and alignable with said aperture, said second die comprising a hollow rod having a rounded rim facing the first named die, and an inner reciprocal member resiliently urged toward the first named die, said hollow rod and inner member having a female frusto-conical end similar to said male end, said inner member being provided with a passage aligned with said punch for disposing of material punched by said punch, means for selectively operating said first die toward the second die, and said second die toward said first die, another die alignable with said aperture carried by said head comprising a threading plunger having threading means thereon, master thread means for moving said plunger and threading means in a predetermined manner toward and away from said bolster when said threading plunger is moved, means for moving said threading plunger, a die carried by said bolster aligned with said third named die and alignable with said aperture, said fourth named die comprising a member movable toward and away from said threading plunger, means for moving said last named member, the end of said last named member having a recess for permitting predetermined movement of said threading plunger, said last named end being bevelled, resilient means between said compression plate and head permitting movement of said plate toward said head, means for selectively aligning said first and second named dies and said aperture and for aligning said third and fourth named dies with said aperture, and means operable to move toward the axis of said threading plunger and recess in a restricting and in substantially a circular manner.

14. In a device of the character described, the combination of a support, a bolster carried by said support, a die supporting head disposed above said bolster, a compression plate supported on said head and having an aperture therethrough, operating means for moving said head toward and away from said bolster in a controlled manner, said head having a die comprising a plunger having a male frusto-conical end terminating in a punch alignable with said aperture, a die in said bolster aligned with said first die alignable with said aperture, said second die comprising a hollow rod having a rounded rim facing the first named die, and an inner reciprocal member resiliently urged toward the first named die, said hollow rod and inner member having a female frusto-conical end similar to said male end, said inner member being provided with a passage aligned with said punch for disposing of material punched by said punch, means for selectively operating said first die toward the second die, and said second die toward said first die, another die alignable with said aperture carried by said head comprising a threading plunger having threading means thereon, master thread means for moving said plunger and threading means in a predetermined manner toward and away from said bolster when said threading plunger is moved, means for moving said threading plunger, a die carried by said bolster aligned with said third named die and alignable with said aperture, said fourth named die comprising a member movable toward and away from said threading plunger, means for moving said last named member, the end of said last named member having a recess for permitting predetermined movement of said threading plunger, said last named end being bevelled, resilient means between said compression plate and head permitting movement of said plate toward said head, means for selectively aligning said first and second named dies and said aperture and for aligning said third and fourth named dies with said aperture, and a die member supported by said bolster providing flanging and cutting means effective upon moving said compression plate toward said bolster a predetermined amount.

15. In a device of the character described, the combination of a support, a bolster carried by said support, a die supporting head disposed above said bolster, a compression plate supported on said head and having an aperture therethrough, operating means for moving said head toward and away from said bolster in a controlled manner, said head having a die comprising a plunger having a male frusto-conical end terminating in a punch alignable with said aperture, a die in said bolster aligned with said first die and alignable with said aperture, said second die comprising a hollow rod having a rounded rim facing the first named die, and an inner reciprocal member resiliently urged toward the first named die, said hollow rod and inner member having a female frusto-conical end similar to said male end, said inner member being provided with a passage aligned with said punch for disposing of material punched by said punch, means for selectively operating said first die toward the second die, and said second die toward said first die, another die alignable with said aperture carried by said head comprising a threading plunger having threading means thereon, master thread means for moving said plunger and threading means in a predetermined manner toward and away from said bolster when said threading plunger is moved, means for moving said threading plunger, a die carried by said bolster aligned with said third named die and alignable with said aperture, said fourth named die comprising a member movable toward and away from said threading plunger, means for moving said last named member, the end of said last named member having a recess for permitting predetermined movement of said threading plunger, said last named end being bevelled, resilient means between said compression plate and head permitting movement of said plate toward said head, means for selectively aligning said first and second named dies and said aperture and for aligning said third and fourth named dies with said aperture, and means carried by said compression plate for restricting said last named aperture in substantially a circular manner, and a die member supported by said bolster providing flanging and cutting means effective upon moving said compression plate toward said bolster a predetermined amount.

16. In a device of the character described, the combination of a support, a bolster carried by said support, a die supporting head disposed above said bolster, a compression plate supported on said head and having an aperture therethrough, operating means for moving said head toward and away from said bolster in a controlled manner, said head having a die comprising a plunger having a male frusto-conical end terminating in a punch alignable with said aperture, a die in said bolster aligned with said first die and alignable with said aperture, said second die comprising a hollow rod having a rounded rim facing the first named die, and an inner reciprocal member resiliently urged toward the first named die, said hollow rod and inner member having a female frusto-conical end similar to said male end, said inner member being provided with a passage aligned with said punch for disposing of material punched by said punch, means for selectively operating said first die toward the second die, and said second die toward said first die, another die alignable with said aperture carried by said head comprising a threading plunger having threading means thereon, master thread means for moving said plunger and threading means in a predetermined manner toward and away from said bolster when said threading plunger is moved, means for moving said threading plunger, a die carried by said bolster aligned with said third named die and alignable with said aperture, said fourth named die comprising a member movable toward and away from said threading plunger, means for moving said last named member, the end of said last named member having a recess for permitting predetermined movement of said threading plunger, said last named end being bevelled, resilient means between said compression plate and head permitting movement of said plate toward said head, means for selectively aligning said first and second named dies and said aperture and for aligning said third and fourth named dies with said aperture, and means for restricting said last named aperture in substantially a circular manner, and a die member supported by said bolster providing flanging and cutting means effective upon moving said compression plate toward said bolster a predetermined amount.

17. In a device of the character described, the combination of a support, a bolster carried by said support, a die supporting head disposed above said bolster, a compression plate supported on said head and having an aperture therethrough, operating means for moving said head toward and away from said bolster in a controlled manner, said head having a die comprising a plunger having a male frusto-conical end terminating in a punch alignable with said aperture, a die in said bolster aligned with said first die and alignable with said aperture, said second die comprising a hollow rod having a rounded rim facing the first named die, and an inner reciprocal member resiliently urged toward the first named die, said hollow rod and inner member having a female frusto-conical end similar to said male end, said inner member being provided with a passage aligned with said punch for disposing of material punched by said punch, means for selectively operating said first die toward the second die, and said second dies toward said first die, another die alignable with said aperture carried by said head comprising a threading plunger having threading means thereon, master thread means for moving said plunger and threading means in a predetermined manner toward and away from said bolster when said threading plunger is moved, means for moving said threading plunger, a die carried by said bolster aligned with said third named die and alignable with said aperture, said fourth named die comprising a member movable toward and away from said threading plunger, means for moving said last named member, the end of said last named member having a recess for permitting predetermined movement of said threading plunger, said last named end being bevelled, resilient means between said compression plate and head permitting movement of said plate toward said head, means for selectively aligning said first and second named dies and said aperture and for aligning said third and fourth named dies with said aperture, and means carried by said compression plate operable to move toward the axis of said threading plunger and recess in a restricting and in substantially a circular manner, and a die member supported by said bolster providing flanging and cutting means effective upon moving said compression-plate toward said bolster a predetermined amount.

18. In a device of the character described, the combination of a support, a bolster carried by said support, a die supporting head disposed above said bolster, a compression plate supported on said head and having an aperture therethrough, operating means for moving said head toward and away from said bolster in a controlled manner, said head having a die comprising a plunger having a male frusto-conical end terminating in a punch alignable with said aperture, a die in said bolster aligned with said first die and alignable with said aperture, said second die comprising a hollow rod having a rounded rim facing the first named die, and an inner reciprocal member resiliently urged toward the first named die, said hollow rod and inner member having a female frusto-conical end similar to said male end, said inner member being provided with a passage aligned with said punch for disposing of material punched by said punch, means for selectively operating said first die toward the second die, and said second die toward said first die, another die alignable with said aperture carried by said head comprising a threading plunger having threading means thereon, master thread means for moving said plunger and threading means in a predetermined manner toward and away from said bolster when said threading plunger is moved, means for moving said threading plunger, a die carried by said bolster aligned with said third named die and alignable with said aperture, said fourth named die comprising a member movable toward and away from said threading plunger, means for moving said last named member, the end of said last named member having a recess for permitting predetermined movement of said threading plunger, said last named end being bevelled, resilient means between said compression plate and head permitting movement of said plate toward said head, means for selectively aligning said first and second named dies and said aperture and for aligning said third and fourth named dies with said aperture, and means operable to move toward the axis of said threading plunger and recess in a restricting and in substantially a circular manner, and a die member supported by said bolster providing flanging and cutting means effective upon moving said compression plate toward said bolster a predetermined amount.

ROY J. THOMPSON.

REFERENCES CITED

The following references are of record in the file of this patent:

UNITED STATES PATENTS

| Number | Name | Date |
| --- | --- | --- |
| 1,088,641 | Webster | Feb. 24, 1914 |
| 1,884,631 | Dunham | Oct. 25, 1932 |
| 2,267,015 | Church | Dec. 23, 1941 |
| 2,367,015 | Finzel et al. | Jan. 9, 1945 |
| 2,372,011 | Remington et al. | Mar. 20, 1945 |
| 2,382,014 | Ernst | Aug. 14, 1945 |

Certificate of Correction

Patent No. 2,493,933

January 10, 1950

ROY J. THOMPSON

It is hereby certified that errors appear in the printed specification of the above numbered patent requiring correction as follows:

Column 5, line 42, for "plunger" read *plunger 272*; column 17, line 41, for "compression-plate" read *compression plate*; column 18, list of references cited, line 53, for the patent number "2,382,014" read *2,382,041*;

and that the said Letters Patent should be read with these corrections therein that the same may conform to the record of the case in the Patent Office.

Signed and sealed this 6th day of June, A. D. 1950.

[SEAL]

THOMAS F. MURPHY,
*Assistant Commissioner of Patents.*